United States Patent [19]

Banas et al.

[11] 4,010,345
[45] Mar. 1, 1977

[54] GAS DELIVERY MEANS FOR CUTTING WITH LASER RADIATION

[73] Assignee: United Technologies Corporation, Hartford, Conn.

[22] Filed: May 2, 1975

[21] Appl. No.: 574,132

[52] U.S. Cl. .............................................. 219/121 L
[51] Int. Cl.² ......................................... B23K 27/00
[58] Field of Search ... 219/121 L, 121 LM, 121 EB, 219/121 EM, 121 P; 331/DIG. 1

[56] References Cited

UNITED STATES PATENTS

| | | | |
|---|---|---|---|
| 2,951,143 | 8/1960 | Anderson et al. | 219/121 P |
| 3,271,556 | 9/1966 | Harris | 219/121 EB |
| 3,388,235 | 6/1968 | Pinsley et al. | 219/121 EB |
| 3,597,578 | 8/1971 | Sullivan et al. | 219/121 L |
| 3,604,890 | 9/1971 | Mullaney et al. | 219/121 L |
| 3,621,198 | 11/1971 | Herbrich | 219/121 L X |
| 3,696,230 | 10/1972 | Friedrich | 219/121 L |
| 3,757,078 | 9/1973 | Conti et al. | 219/121 L |

[75] Inventors: Conrad M. Banas, Manchester; Aristotle Parasco, South Glastonbury, both of Conn.

Primary Examiner—Arthur T. Grimley
Assistant Examiner—G. R. Peterson
Attorney, Agent, or Firm—Anthony J. Criso

[57] ABSTRACT

Gas delivery means for providing a flow of gas to the kerf in a workpiece which is being cut by a beam of laser radiation is disclosed. The distribution means consists of a thin wafer which is placed in the path of the cutting beam adjacent to the workpiece and a stream of gas directed along the axis of laser propagation blows the kerf clean. An upper gas port and a lower gas port allow the laser radiation to pass through the wafer without any transmissive optics. Use of the gas delivery means with various gases at high pressure and with laser beams at power levels which were previously impractical are discussed.

4 Claims, 2 Drawing Figures

GAS DELIVERY MEANS FOR CUTTING WITH LASER RADIATION

The invention herein described was made in the course of or under a contract or subcontract thereunder with the Department of the Air Force.

BACKGROUND OF THE INVENTION

1. Field of the Invention

The present invention relates to the cutting of materials with laser radiation and more particularly to means for supplying gas to the kerf in a laser system operating with a high power density.

2. Description of the Prior Art

In the metal working field various techniques have been developed for cutting materials with laser radiation. The interaction between a beam of laser radiation and a material such as a metal is basically very similar whether welding or cutting is the desired result, however, cutting is encouraged by the appropriate location of flowing gas to the reaction region of the workpiece. Various types of gases are used in cutting, some being inert and others being very reactive with the workpiece per se in an exothermic fashion to actually enhance the cutting action of the laser radiation. The flowing of a gas into the fissure during a cut serves several purposes, the principal ones of which are the removal of molten material which is formed in the cut and the minimization of contamination of the laser beam focusing optics by material emitted from the reaction region and other foreign elements in the area of the weld.

One of the early efforts in this area is taught by Sullivan et al. in U.S. Pat. No. 3,597,578 entitled Thermal Cutting Apparatus And Method filed on Mar. 13, 1968. Sullivan et al. discuss cutting with a gas laser with a jet of gas directed into the kerf along the centerline axis of propagation of the laser beam. The gas reacts with the workpiece and enhances the cutting characteristics of the system. One of the shortcomings of Sullivan et al. is its power handling limitation. The optical train which brings the laser radiation to the workpiece from a source includes a chamber positioned adjacent to the workpiece and a focusing lens. The chamber serves to direct gas onto the workpiece in the desired direction and the lens forms a window in the path of the laser beam. The materials currently available to transmit laser radiation, particularly at infrared wavelengths, limit the amount of power which can be delivered to the workpiece. These materials also impose a restriction on the pressure at which the chamber which contains the cutting assist gas is operable. In many practical applications, the power density and gas pressure required for optimum cutting often exceed the limits imposed by transmitting window technology.

A related teaching is provided by Schlafli in U.S. Pat. No. 3,601,576 entitled Method For Boring Workpieces By Laser Pulses filed on Sept. 13, 1968. Schlafli discloses the use of air and other gases to scavenge the bore and clear away ejected residue primarily from workpieces which are drilled by pulses of laser radiation. A low pressure region provided below the workpiece to assist in the removal of materials from the work area is also disclosed. Schlafli teaches the use of gases which are both on axis and off axis, and the technique is governed by the restraint that radiation transmissive optics are required to contain and control the gas flow to the workpiece.

In U.S. Pat. No. 3,629,546 entitled Air Cooled Laser Processing Of Materials filed on Apr. 2, 1969, Frye also discloses the use of a gas to assist in cutting. The Frye invention includes the same major elements of the prior art discussed above, namely, a source of laser radiation, a gas jet, and a workpiece to remove the vaporized material from the region. Frye is not concerned with keeping the gas flow on the axis of propagation of the laser radiation since he is using the gas only to remove vaporized material from the region immediately above the workpiece.

A related teaching is provided by Houldcroft in U.S. Pat. No. 3,679,863 entitled Thermal Cutting Apparatus filed Nov. 10, 1969. Houldcroft is similar to the materials discussed above and contains the additional recognition that an atomized stream of liquid coolant can be directed onto the workpiece in the vicinity of the cut to prevent charring and burning of various types of materials. In U.S. Pat. No. 3,612,814 entitled Cutting Process Employing A Laser filed Jan. 6, 1970, Houldcroft teaches still another system which deals with the controlled flow of gas to the cut region to affect the speed and quality of cutting. This teaching involves providing a suction region under the cut line to draw off the various by-products from the cutting process and is very similar to some of the disclosure of Schlafli. An additional patent which is indicative of the state of the existing art is U.S. Pat. No. 3,569,660 entitled Laser Cutting Apparatus filed on July 29, 1968 by Houldcroft. This apparatus is similar to much of the art discussed above and introduces the concept of providing an assist material which causes a fluxing action in the work area.

A common shortcoming of all this art is the requirement for transmissive optics in the path of the cutting beam if gas is applied to the cut region along the axis of propagation and this in turn limits the amount of power which can be concentrated on the workpiece. Further, the ability to direct a stream of gas through the cut region is limited in each of these devices because the gas being directed into the cut along the axis of propagation subjects the transmissive optics to pressure loadings. Various attempts to improve cutting have been made using a gas jet which is directed onto the workpiece from an off axis location. This type of system obviously is not pressure limited since the gas and the laser radiation travel along different axes of propagation and the transmissive window is not subject to pressure loadings. However, since the gas jet is off axis, not all of the gas momentum serves to remove molten metal and cutting performance is significantly reduced compared with what could be done with a coaxially flowing assist gas.

SUMMARY OF THE INVENTION

A primary object of the present invention is to enhance the operation characteristics of laser cutting apparatus.

According to the present invention an enclosure suitable for providing gas to the kerf in a workpiece being cut by a beam of laser radiation being propagated along an axis is formed as a thin wafer having gas flow means including an inlet and a pair of outlet ports, of different cross sectional areas, which are aligned with each other and suitable for being positioned symmetrically about the axis to allow the beam to pass through the wafer without interference and provide a continuous supply of gas under pressure to the work area in the workpiece.

One of the primary features of the present invention is the ability to insert the enclosure in the path of the incident beam of cutting radiation without presenting any solid barrier through which the radiation must travel. Also, the enclosure or chamber is supported in a manner which allows the gas flowing over and into the kerf to draw the chamber into close proximity with the surface of the workpiece. The chamber includes gas inlet means and two gas discharge orifices through which the laser beam also passes. The chamber is held by a structure which is very stiff with respect to movement of the chamber in any direction substantially perpendicular to the propagation axis of the laser beam and relatively flexible with respect to movement in the direction of the axis. The chamber is formed as a thin wafer having a thickness which is small relative to the focal length of the optics delivering the laser radiation to the workpiece through the wafer.

A primary advantage of the present invention is that no residue accumulates on the upper surface of the workpiece when cut with this device. Also, the heat affected zone in the workpiece can be essentially eliminated and the use of assist gas flowing along the axis of laser propagation allows a very narrow kerf in the workpiece. Further, the stream of gas directed onto the workpiece along the axis of propagation prevents the material ejected from the kerf and other foreign matter from contaminating the optical surfaces controlling the beam. Since the gas delivery means can be made very thin, a low f/number radiation focus system can be accommodated.

The foregoing and other objects, features and advantages of the present invention will become more apparent in the light of the following detailed description of preferred embodiments thereof as discussed and illustrated in the accompanying drawing.

DESCRIPTION OF A PREFERRED EMBODIMENT

Figure 1:
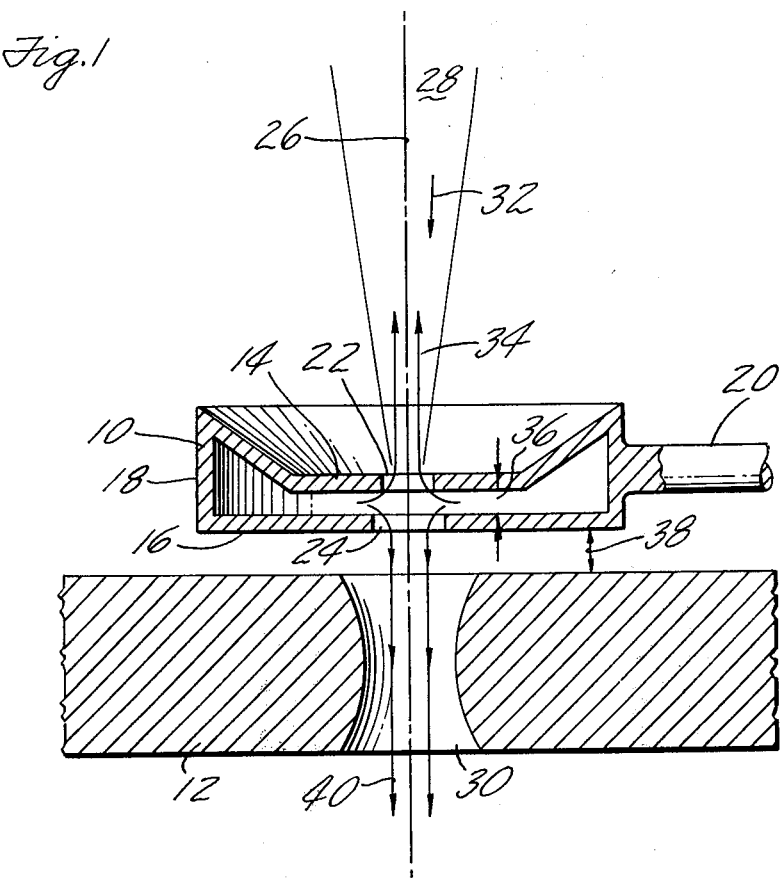
FIG. 1 is a cross sectional view through an enclosure for providing gas to the kerf in a workpiece being cut with laser radiation in accordance with the present invention.
Figure 2:
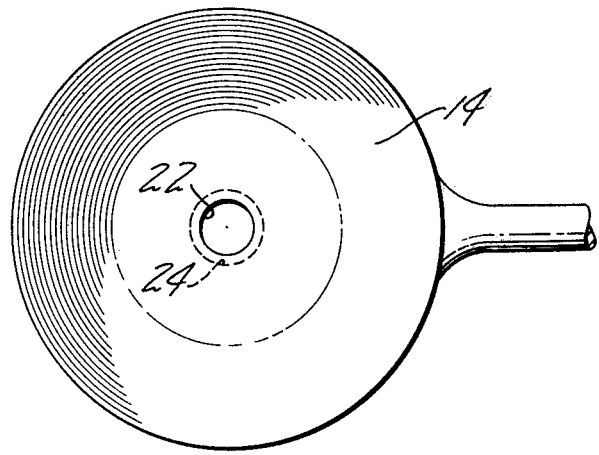
FIG. 2 is a top view of the enclosure shown in FIG. 1.

A typical enclosure 10 in accordance with the present invention is shown in FIG. 1 as a thin wafer adjacent to a workpiece 12. A chamber is formed with a top plate 14 and a bottom plate 16 and together with a vertical wall 18 essentially define its overall contour. The chamber is connected to a gas supply not shown by a gas inlet means 20. The top plate is penetrated by an upper port 22 and the bottom plate is similarly penetrated by a lower port 24, each of these ports being symmetric about a centerline axis 26. Also shown in the Figure is an incident beam 28 of laser radiation which is concentric about the centerline axis and forms a kerf 30 in the workpiece.

In the operation of the chamber in accordance with the present invention in combination with a source of laser radiation to cut materials such as metals, the flowing of a stream of gas along the axis 26 in the direction 32 of beam propagation is required. The gas flow serves several functions, one of the most significant of which is blowing molten material which is created by the laser beam out of the kerf before this material has a chance to resolidify in situ. The composition of the gas varies depending upon the application. For example, an inert gas such as helium or nitrogen is used should a relatively clean cut surface without any substantial oxide formation be desired. In other applications the post cut condition of the surfaces along the cut is less important than the rate at which the cut can be performed and a reactive gas such as oxygen is directed into the kerf to enhance the cutting ability of the laser radiation. Many data exist confirming that the speed and thickness through which the laser radiation will cut is enhanced by increasing the power density and the pressure at which the assist gas is directed through the kerf. Also, these data show that the best results are provided when the assist gas is flowed directly along the axis of the incident radiation because the hottest and least viscous liquid metal exists directly in the path of the laser beam and the momentum of the assist gas is most effective in removing material along this path. In the case of a jet inclined with respect to the axis of laser propagation, the gas is not coaxial with the radiation and the molten metal is not removed as effectively. Also, the gas jet momentum component parallel with the workpiece surface does not serve to remove material directly but sometimes causes severe splatter and an unacceptable cut surface due to impingement upon, and reversal at, the leading edge of the advancing cut.

The diameter of the upper port 22 is for all practical purposes simply a function of the diameter of the incident beam. The port diameter need be just sufficiently large to allow the beam to pass therethrough uninterrupted with additional clearance to allow for possible misalignment between the axis of propagation and the axis of symmetry for the port. As a practical matter, a cutting system in which a six kilowatt beam was focused to a 20 mil spot size on a Waspaloy workpiece, one thirty second of an inch thick operated satisfactorily with an upper port having a diameter of forty mils. A cutting speed of 650 inches per minute was achieved using carbon dioxide as the assist gas. The diameter of the lower port also must be sufficient to allow the beam to pass through uninterrupted, however, the lower port is sized to provide the stream of assist gas into the kerf and is of substantially larger diameter than the upper port. In the example just described, a lower port diameter of 60 mils was found satisfactory and approximately 70 percent of the gas supplied to the enclosure passed through the lower port.

The precise diameter of the upper port is not critical so long as it is large enough to allow the beam to pass through without interference. The diameter of the lower port depends on the cutting application and is usually determined experimentally. The relative dimensions of the two ports is a significant consideration. The ports are sized to result in a major fraction of the assist gas flowing in the direction 32 along the centerline axis to the cut region. The amount that flows in an upward direction 34 is minimized since this gas serves no useful purpose.

The top and bottom plates have a separation distance 36 which is usually minimized to permit the use of low f/number optics. Such optics are usually desired since they provide a spot size of minimum diameter and optimum cutting performance although they do result in a short depth of field. The only limitation on the separation distance 36 is that a sufficient area exist between the top and bottom plates to allow the assist gas to flow to the lower port without any substantial impedance. Should the overall thickness of the enclosure become excessive, either the minimum diameter of the upper port is increased or optics with a higher f/number is required. If the diameter of the port is increased an increased amount of assist gas escapes from the enclosure in the upward direction. Alternatively, the f/number can be increased, however, the spot size increases and the performance is reduced accordingly. Also, in the cutting of thicker materials, some compromise may be required and a higher f/number may be used to increase depth of field. The percentage of the gas from the supply means which is delivered to the kerf decreases as the diameter of the upper port is increased. Another consideration in allowing the overall thickness of the chamber to increase is the effect it has on the focusing optics as discussed above.

A standoff clearance 38 as shown in FIG. 1, represents the space between the bottom of the chamber and the top of the workpiece. Some clearance is necessary to accommodate a nominal amount of alignment mismatch between the chamber and the workpiece so that the workpiece can be moved relative to the chamber during cutting. In practice when the laser is operating and gas is being flowed through the chamber into the kerf, a reduced pressure is created in the clearance 38 due to the gas flow along the axis 26 in a downward direction 40. This reduced pressure under the gas enclosure is explained by well known energy conservation principles of aerodynamic flow and results in a drawing down of the chamber into close proximity with the workpiece. When this occurs, the cutting action of the gas assisted laser is enhanced and no accumulation of molten material ejected from the kerf is observed on the upper surface of the workpiece. A relatively smooth and narrow cut is obtained with a minimum of material loss. Also, the requirement for processing the cut to remove residue, roughness or a heat affected zone after the cutting is completed is eliminated.

Various data have been taken using the present invention to enhance the cutting of metal with a beam of focused laser radiation. The chamber was formed as a wafer one inch in diameter from sheet metal stock 50 mils thick. The top plate had an upper port which was 40 mils in diameter and was 20 mils separated from the bottom plate which had a lower port 60 mils in diameter. The wafer was set up 40 mils off the surface of the workpiece and with an f/4 focusing system providing a spot size 16 mils in diameter; the following results were achieved.

| Material | Thickness Mils | Laser Power (kw) | Cutting Speed (ipm) | Gas | Gas Pressure (psi) |
| --- | --- | --- | --- | --- | --- |
| Waspaloy | 125 | 3 | 140 | $O_2$ | 120 |
| Titanium | 250 | 1.5 | 100 | $O_2$ | 60 |
| Titanium | 125 | 3 | 70 | He | 200 |
| 4340 Steel | 250 | 3 | 70 | $O_2$ | 150 |

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. Gas handling means for use in cutting materials with laser radiation and comprising:
    a hollow structure capable of withstanding an internal gas pressure, and directing gas at a workpiece along a flow axis as a moving stream of cutting assist medium, the structure capable also of allowing a beam of focused laser radiation propagated along a laser axis to pass therethrough without interference, the hollow structure having an upper plate and a lower plate and including;
    inlet means for receiving the gas from a source and admitting the gas under pressure to the interior of the structure, and
    gas outlet means for releasing the pressurized gas through the upper and lower plates along the flow axis and delivering a stream of the gas to the location on the workpiece at which the radiation is focused, the outlet means having a first gas port positioned in the upper plate and a second gas port positioned in the lower plate.

2. The invention according to claim 1 wherein the cross sectional area of the first port is less than the cross sectional area of the second port.

3. The invention according to claim 2 wherein the first and second ports are concentric about the axis of propagation of the laser beam.

4. The invention according to claim 3 wherein the first and second ports are circular in cross section.

* * * * *